May 9, 1933. J. P. SPANG 1,907,602
MEAT CUBING MACHINE
Filed June 13, 1931 3 Sheets-Sheet 1
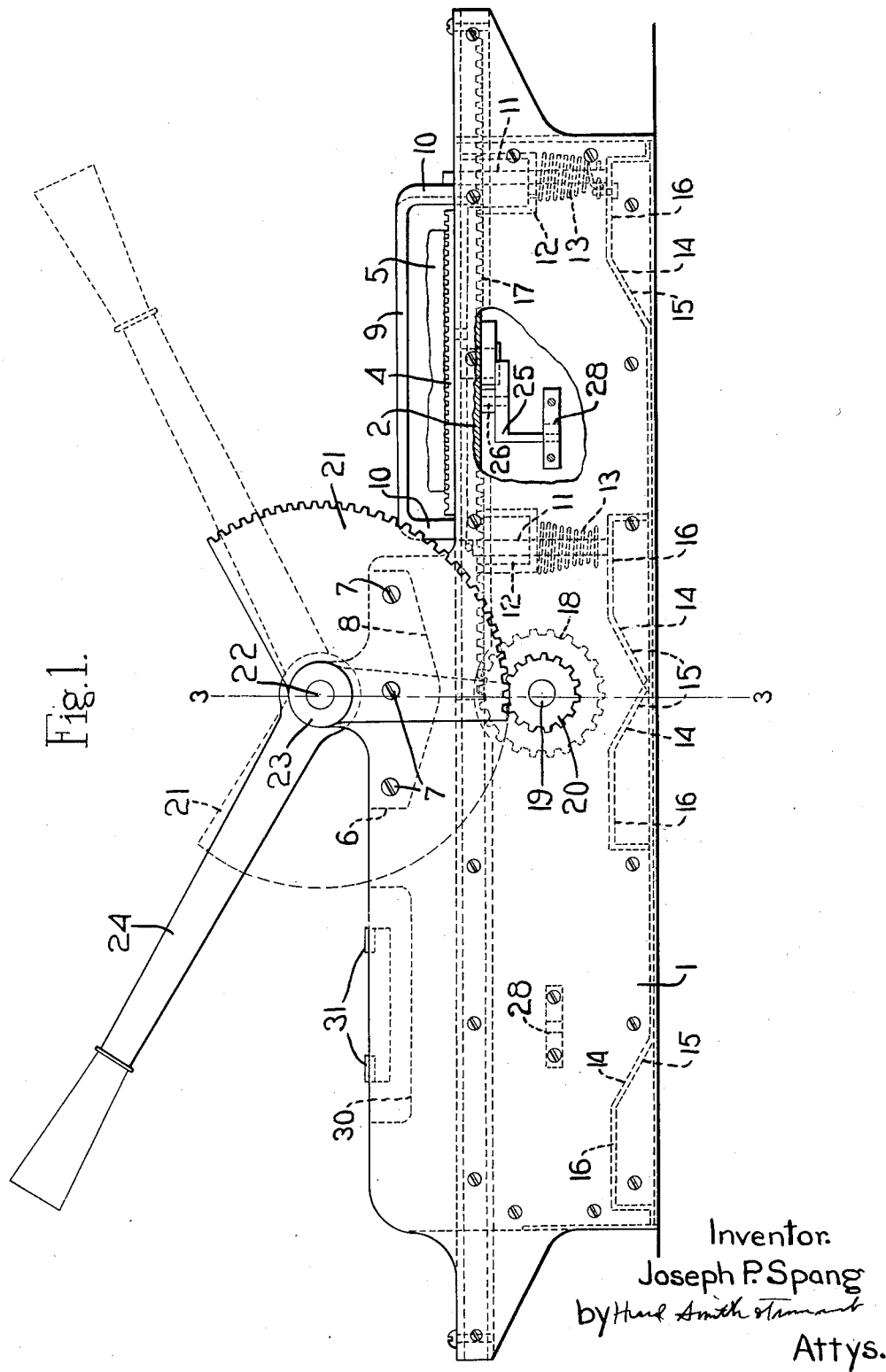
Inventor.
Joseph P. Spang
by Hurd Smith Stewart
Attys.

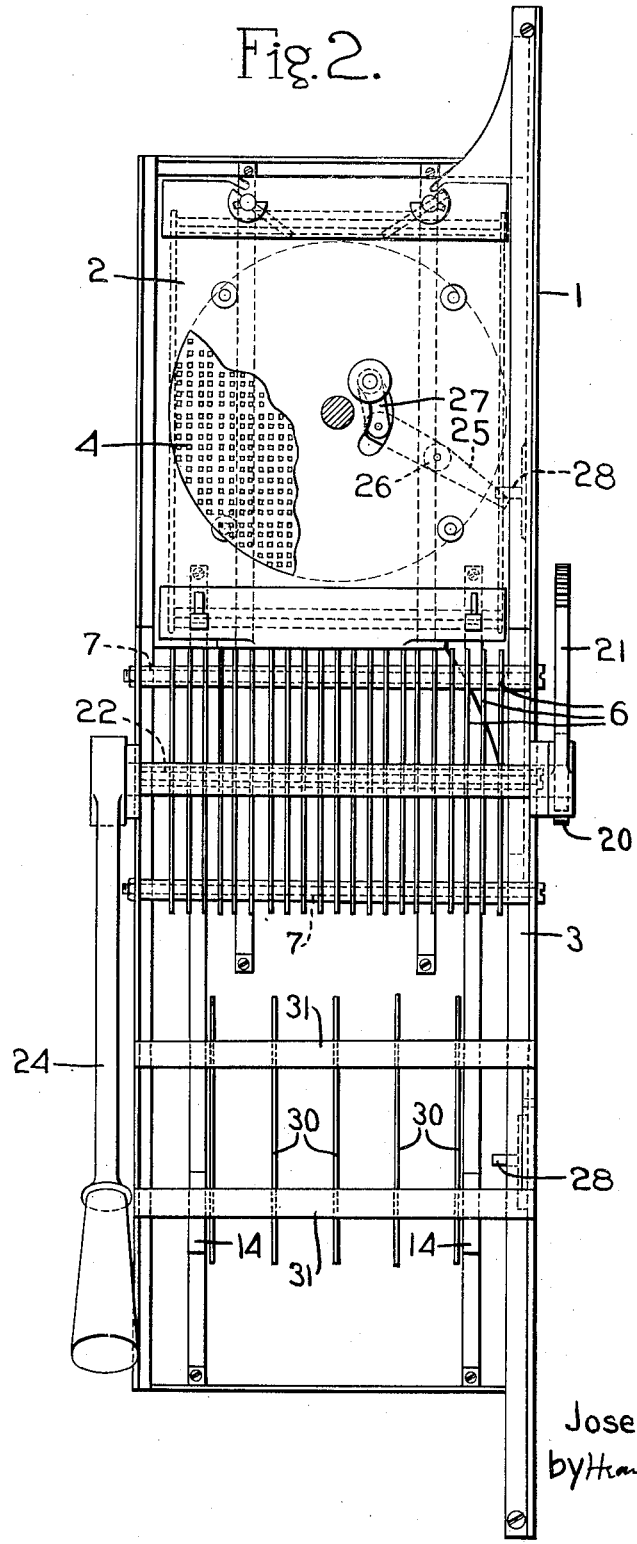

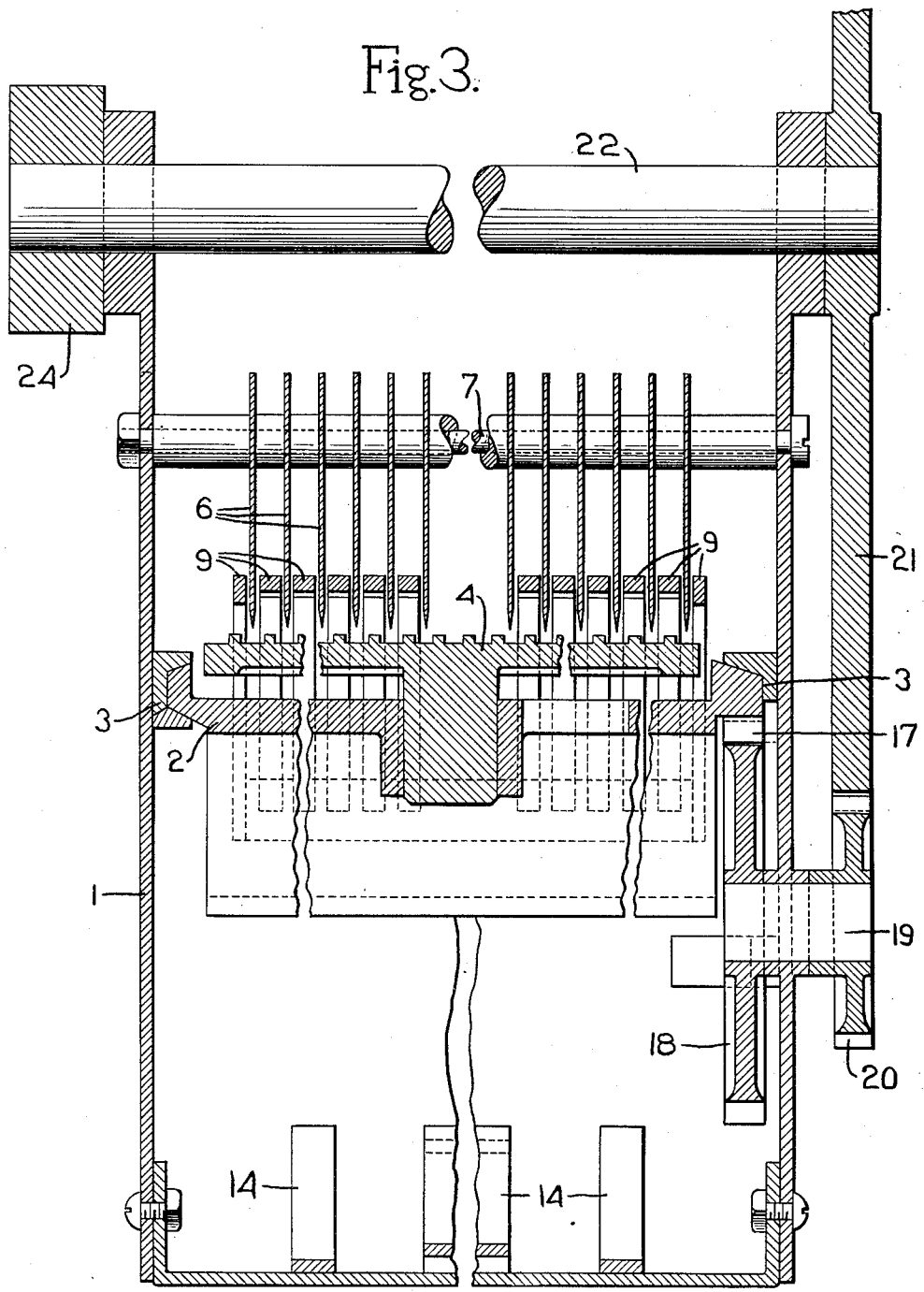

Patented May 9, 1933

1,907,602

UNITED STATES PATENT OFFICE

JOSEPH P. SPANG, OF QUINCY, MASSACHUSETTS

MEAT-CUBING MACHINE

Application filed June 13, 1931. Serial No. 544,256.

This invention relates to meat-cubing machines by which slits may be cut in two different directions in a slice of meat. The invention is in some respects similar to that illustrated in my Patent No. 1,646,711, October 25, 1927, in that it embodies a carriage on which is mounted a turntable for supporting meat and means to move the carriage back and forth underneath a gang of slitting knives and to turn the table at each end of the stroke.

In the present invention, however, the slitting knives are stationary blades and the mechanism for operating the carriage comprises a lever and operative connections between said lever and carriage by which the carriage will be given its full movement during a single stroke of the lever.

In order to give an understanding of the invention I have illustrated in the drawings a selected embodiment thereof which will now be described after which the novel features will be pointed out in the appended claims.

Fig. 1 is a side view of a machine embodying my invention;

Fig. 2 is a top plan view with a portion broken out;

Fig. 3 is an enlarged section on the line 3—3, Fig. 1.

The device comprises a suitable frame 1 in which is mounted a carriage 2 for reciprocation longitudinally of the frame 1. This carriage is shown as mounted in and guided by suitable ways 3 carried by the sidewalls of the frame 1. Mounted on the carriage 2 is a turntable 4 on which the slice of meat 5 to be slit is placed.

The frame also supports a gang of stationary slitting knives 6 which are herein shown as mounted on three rods or supports 7 that extend transversely across the frame 1 and are mounted in the side walls thereof.

The lower edge 8 of each knife is a cutting edge and its cutting edge inclines downwardly from each end of the knife toward the center as shown best in dotted lines Fig. 1.

The slitting knives 6 are so supported that the lowest point of the cutting edge thereof is slightly above the upper surface of the turntable. Consequently when a slice 5 of meat is placed on the table 4 and the carriage is moved from one end of its travel to the other the knives 6 will cut slits in the meat 5 as it passes beneath the knives. The adjustment of the knives is such that the slits are not cut entirely through the meat but are cut nearly to the bottom surface of the meat. When the carriage has reached the end of its travel in either direction the turntable is given a turning movement through approximately 90° so that upon the return movement of the carriage a series of slits will be cut in the meat at right angles to the first slits thereby "cubing" the meat as it is commonly termed.

During the time the meat is being acted on by the slitting knives 6 the meat is clamped to the turntable by means of a hold-down or clamping element 9 which is similar to that shown in my above-mentioned Patent No. 1,646,711. This clamping element comprises a plurality of U-shaped members, the legs 10 of which are connected to spring-pressed plungers 11 that operate through suitable brackets or guides 12 carried by the carriage 2. Each plunger 11 is acted on by a spring 13, said springs exerting a down force on the plungers 11 and thus normally holding the members 9 yieldingly against the top surface of the meat 5. At the end of the travel of the carriage 2 in each direction the hold-down members 9 are automatically raised from engagement with the meat as shown in Fig. 1 thereby unclamping the meat so that the turntable is free to be turned or the meat is free to be removed from the turntable and replaced by another piece of meat.

The means for thus raising the clamping means comprises cam elements 14 carried by the frame and situated to engage the lower ends of the plungers 11. These cam elements 14 have the upwardly-inclined cam portion 15 and the raised horizontal portion 16. As the carriage approaches the end of each stroke in either direction the plungers 11 ride up the inclined faces 15 thereby raising the hold-down 9 against the action of the springs 13 and said hold-down will be held in raised position by the engagement of the plungers with the horizontal portion 16 of the cam elements until after the carriage has started on its return movement.

One feature of the present invention relates to a novel means for giving the carriage its movement. The carriage is provided on its under side with rack teeth 17 which mesh with a gear 18 mounted on a shaft 19 journalled in the frame. This shaft carries a pinion 20 at its end which is illustrated as being situated outside of the frame.

Said pinion meshes with a segmental gear 21 fast on a rock shaft 22 that is journalled in suitable bearings 23 carried by one side of the frame. This rock shaft extends transversely of the frame and on the end opposite to that which carries the gear 21 there is mounted a handle or lever 24.

When the carriage 2 is at the front end of the frame as shown in Fig. 1 the handle 24 will be in its rearward most position as shown in full lines Fig. 1. After a piece of meat 5 has been placed on the turntable the operator grasps the handle 24 and swings it forwardly into the dotted line position Fig. 1. This swinging movement of the handle turns the gear 21 into the dotted line position thereby operating through the gears 20 and 18 to move the carriage 2 to the left hand limit of its movement.

As the carriage leaves its right hand position the plungers 11 pass down the inclined faces 15 of the right hand cams 14 thereby allowing the springs 13 to lower the clamping member 9 onto the meat. This occurs before the meat is engaged by the knives. As the meat passes under the knives they cut the slits therein and as the carriage reaches the left hand end of its travel the plungers 11 are again raised by the left hand members 14 thereby unclamping the meat. As the carriage reaches the left hand end of its movement the turntable 4 is given a turning movement through 90° by means similar to that described in my above-mentioned Patent No. 1,646,711. This means comprises a lever 25 pivotally mounted at 26 to the under side of the carriage and connected by a link 27 to the turntable 4. This lever 25 co-operates with two stop members 28 secured to the frame 1. As the carriage approaches either limit of its movement the lever 26 is engaged by one of the stop members 28 and is thereby turned relative to the carriage, such turning movement acting through the link 27 to turn the turntable as described more completely in my above-mentioned Patent No. 1,646,711.

The present invention obviates the use of rotary knives and the device herein illustrated is so constructed that swinging movement of the lever 24 is sufficient to move the carriage from one end to the other of its travel so that in order to cube a slice of steak all that is necessary is to place the steak on the turntable, then to swing the lever from the full to the dotted line position and return the lever to the full line position. The swinging movement of the lever in one direction will cut a series of slits in the steak and will also turn the turntable through 90° while a movement of the lever in the opposite direction will return the carriage to its normal position thereby causing a second series of slits to be cut in the meat at right angles to the slits of the first series.

30 indicates stripper plates which are carried by cross bars 31 situated at the rear of the frame. These stripper plates are so located that they are directly over the turntable when it is at the rear limit of its movement. The purpose of these stripper plates is to prevent the meat 5 from being lifted off the turntable by the rising hold-down members 9. As the carriage approaches the rear end of its movement, which is the left-hand end in Fig. 1, the plungers 11 will ride up the inclined cam faces 15, thereby elevating the clamping member 9. At this time the carriage is moving between the stripper plates so that if the meat tends to stick to the hold-down member 9, the stripper plate 30 will strip the meat therefrom and retain it on the turntable.

I claim:

1. In a meat-cubing machine, the combination with a frame having ways, of a meat-supporting carriage mounted for movement in said ways, said carriage having rack teeth on its under face, a gang of slitting knives carried by the frame and having their slitting edges situated slightly above the line of travel of said carriage, a lever pivoted to said frame, a segmental gear rigid with the lever, a pinion meshing with said gear, and a second gear larger than the pinion but rigid therewith and meshing with the rack teeth, said segmental gear having a radius considerably larger than the pinion, whereby a swinging movement of the lever through an arc of less than 180° will move the carriage from one side to the other of the knives.

2. In a meat-slitting machine, the combination with a frame having ways, of a meat-supporting carriage mounted for movement in said ways, a gang of slitting knives stationarily carried by the frame, a shaft pivoted in said frame above said knives, a segmental gear fast on the shaft, a pinion journalled in the frame and meshing with said segmental gear, said pinion having a radius considerably smaller than that of the segmental gear, a gear larger than the pinion but rigid therewith, said carriage having rack teeth on its under face meshing with the teeth of said last-named gear, and a handle carried by the shaft and extending therefrom in a radial direction opposite to that of the segmental gear.

In testimony whereof, I have signed my name to this specification.

JOSEPH P. SPANG.